(12) United States Patent
Huang et al.

(10) Patent No.: US 6,346,883 B1
(45) Date of Patent: Feb. 12, 2002

(54) MOBILE SECURITY SYSTEM AND AUTO DIALING UNIT USED SAME

(75) Inventors: Chih-Fu Huang, No. 198, Goang Fu Road, Pa Te City, Taoyuan (TW); Hsin-Fu Yu, Pa Te City (TW); Chin-Chen Chen, 86, Sec. 1, Jieh Shou Road, Pa Te City, Taoyuan (TW)

(73) Assignees: Chih-Fu Huang; Chin-Chen Chen, both of Pa Te City (TW)

( * ) Notice: Subject to any disclaimer, the term of this patent is extended or adjusted under 35 U.S.C. 154(b) by 0 days.

(21) Appl. No.: 09/373,134

(22) Filed: Aug. 12, 1999

(51) Int. Cl.[7] .................. G08B 1/08; H04M 11/04
(52) U.S. Cl. ............. 340/539; 340/425.5; 340/531; 340/331; 379/37; 379/40; 379/51
(58) Field of Search ............... 340/539, 531, 340/331, 332, 425.5; 379/37–40, 51

(56) References Cited

U.S. PATENT DOCUMENTS

| | | | | |
|---|---|---|---|---|
| 4,092,643 A | * | 5/1978 | Stolarczyk | 340/539 |
| 4,661,804 A | * | 4/1987 | Abel | 340/539 |
| 4,692,742 A | * | 9/1987 | Raizen et al. | 340/539 |
| 5,319,698 A | * | 6/1994 | Glidewell et al. | 379/39 |

* cited by examiner

Primary Examiner—Donnie L. Crosland
(74) Attorney, Agent, or Firm—Thomas R. Vigil (57) ABSTRACT

A mobile security system, which includes a warning signal transmitter unit installed in the place or equipment to be protected, an auto dialing unit having a signal receiver, and a cellular phone coupled to the auto dialing unit, wherein when the warning signal transmitter unit detects an abnormal condition, it immediately sends a warning signal to the signal receiver by radio, and the signal receiver immediately drives the auto dialing unit to dial a particular telephone number upon receipt of the warning signal, so as to inform a particular person or security center to take the necessary step. The auto dialing unit can be a mechanical design, or an electronic design as desired.

11 Claims, 13 Drawing Sheets

MOBILE SECURITY SYSTEM AND AUTO DIALING UNIT USED SAME

BACKGROUND OF THE INVENTION

The present invention relates to a mobile security system, and more particularly to such a mobile security system, which comprises a warning signal transmitter unit installed in the place to be protected to monitor the surrounding, an auto dialing unit having a signal receiver, and a cellular phone coupled to the auto dialing unit and driven by the auto dialing unit to call a particular telephone number for help when the signal receiver receives a radio warning signal from the warning signal transmitter unit.

Following fast development of economics, the living quality is greatly improved. Most families have a car for transportation. However, in the modern society, there are many lazy people hoping to gain without effort, and theft cases occur every day. In order to improve the living quality of the surroundings, it is important to reduce the frequency of occurrence of theft cases. A variety of security systems have been developed for this purpose. A regular security system is generally comprised of a plurality of sensors installed in fixed locations in the place or equipment to be protected to monitor the surroundings, and alarm means connected to the sensors. The alarm means is triggered to alarm when the sensors detect an abnormal condition. Because the sensors installed in fixed locations, they can easily found out and damaged by the intruder. When an abnormal condition occurs, the security person in charge is informed to check the situation, and then to inform the owner of the place or equipment under protection after checking. Because the owner of the place or equipment under protection is not informed before the security person goes to check the situation, the owner of the place under protection may be unable to take the necessary step in time. Further the alarm signal of the alarm means can be heard or seen only within a limited distance from the place or equipment under protection. If the owner of the place or equipment under protection is beyond the effective range of the alarm means, the security system may work in vain.

SUMMARY OF THE INVENTION

The present invention has been accomplished under the circumstances in view. According to one aspect of the present invention, the mobile security system comprises a warning signal transmitter unit installed in the place or equipment to be protected, an auto dialing unit having a signal receiver, and a cellular phone coupled to the auto dialing unit. When the warning signal transmitter unit detects an abnormal condition, it immediately sends a warning signal to the signal receiver by radio, and the signal receiver immediately drives the auto dialing unit to dial a particular telephone number upon receipt of the warning signal, so as to inform a particular person or security center to take the necessary step. According to another aspect of the present invention, the auto dialing unit can be a mechanical design, or an electronic design as desired. Because the auto dialing unit is coupled to the cellular phone and controlled by the warning signal transmitter unit by radio, the auto dialing unit can be kept with the cellular phone from sight.

DETAILED DESCRIPTION OF THE PREFERRED EMBODIMENT

Figure 1:
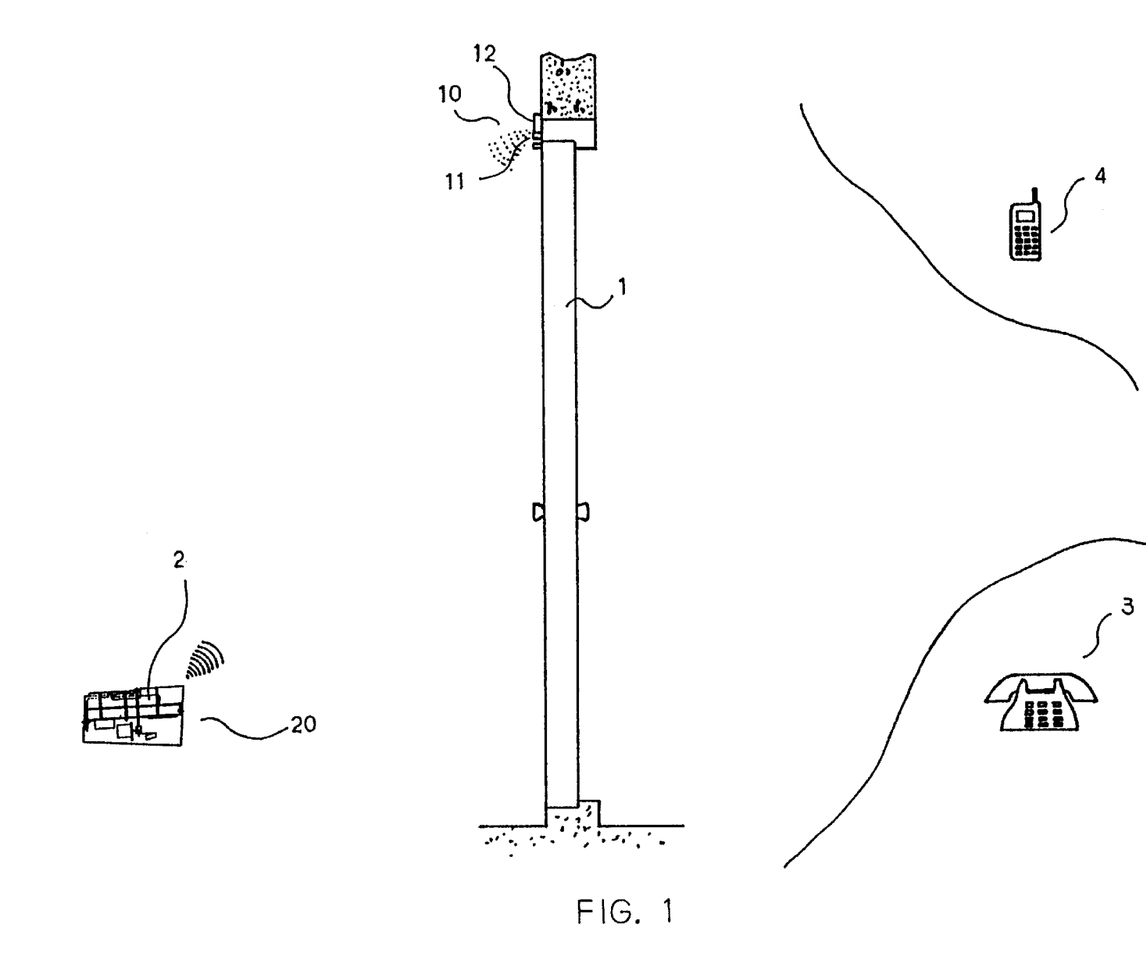
FIG. 1 is a schematic drawing showing the arrangement and operation of a security system according to a first embodiment of the present invention.

Referring to FIG. 1, a movable security system according to a first embodiment of the present invention comprises a warning signal transmitter unit 10 installed in, for example, the window 1 of a house, a mechanical type auto dialing unit 20, and a master cellular phone 2 coupled to the mechanical type auto dialing unit 20. The warning signal transmitter unit 10 comprises a sensor 11, and a signal transmitter 12. The sensor 11 can be a vibration sensor, fire sensor, infrared sensor, smoke sensor, etc. When the sensor 11 detects a signal, it immediately drives the signal transmitter 12 to sends a warning signal into the air by radio. The mechanical type auto dialing unit 20 comprises a signal receiver 21 for receiving the warning signal from the signal transmitter 12. Upon receipt of the warning signal from the signal transmitter 12, the signal receiver 21 immediately drives the auto dialing unit 20 to dial a particular telephone number, for example, the telephone number of a telephone 3 or a sub-cellular phone 4 through the master cellular phone 2, so as to inform a particular person or security center to take the necessary step. The master cellular phone 2 is recorded with a warning message, for example, the bark of a dog. When the telephone 3 or sub-cellular phone 4 is connected, the warning message, i.e., the bark of a dog is transmitted from the master cellular phone 2 to the telephone 3 or sub-cellular phone 4, informing the person in charge about the occurrence of an abnormal condition.

Referring to FIGS. from 2 through 8, the mechanical type auto dialing unit 20 comprises a rack 50, an adjustable cellular phone carrier board 60, an actuating bar 70, a control device 80 having the aforesaid signal receiver 21 installed therein, a movable pressure device 90 for driving the actuating bar 70 up and down, a driving device 100, and a power supply unit 110. The rack 50 comprises two opposing vertical boards 51 and 52 arranged in parallel, and a horizontal board 53 connected between the vertical boards 51 and 52. The vertical boards 51 and 52 each comprise a longitudinally extended step structure 511 or 521, a substantially rectangular top recess 54 or 55 on the middle. Two buffer devices 56 and 57 are respectively mounted in the top recesses 54 and 55 at the vertical boards 51 and 52. The buffer devices 56 and 57 each comprise a screw bolt 561 or 571, which is mounted in a vertical through hole (not shown) at the top recess 54 or 55 and extended to the stepped structure 511 or 521, and a spring 562 or 572, which is mounted on the top recess 54 or 55 around the screw bolt 561 or 571, and imparts an upward pressure to the screw bolt 561 or 571.

Figure 6:
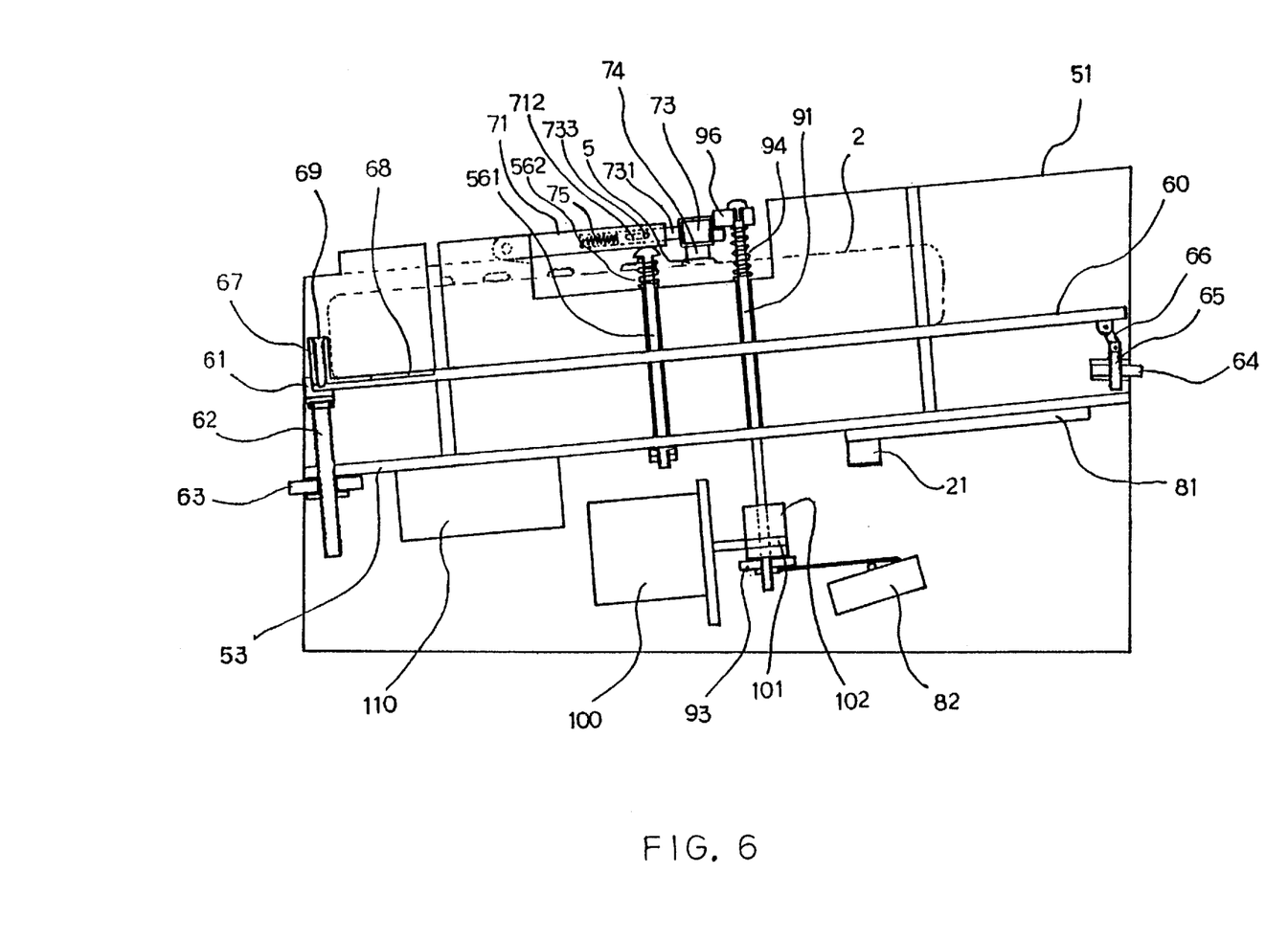
FIG. 6 is a side plain view of FIG. 5.
Figure 7:
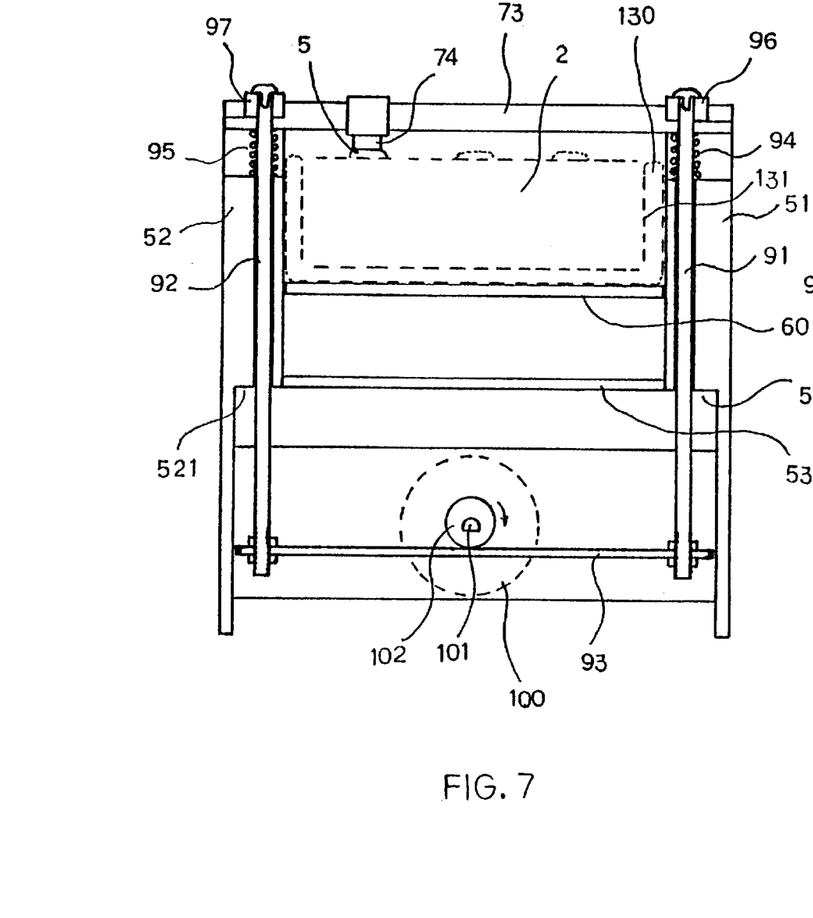
FIG. 7 is a sectional view taken along line A—A of FIG. 5.
Figure 8:
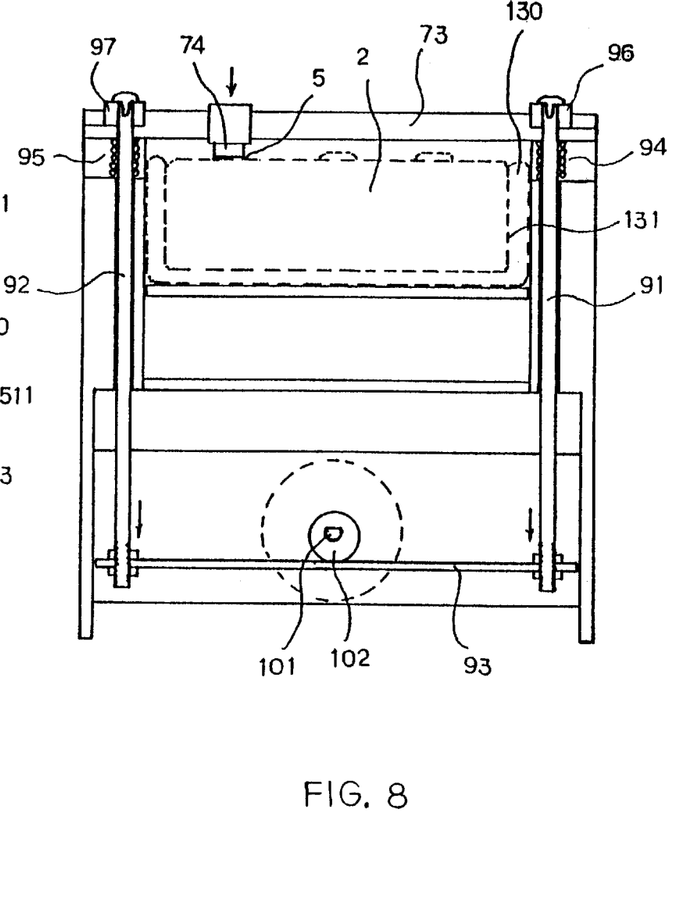
FIG. 8 is similar to FIG. 7 but showing the "OK" key button of the master cellular phone triggered.

The adjustable cellular phone carrier board 60 is supported on the horizontal board 53 inside the rack 50 to carry the master cellular phone 2 (see FIG. 6). As illustrated in FIG. 3, the adjustable cellular phone carrier board has its one end, namely, the bottom end pivoted to a U-bar 61. The U-bar 61 comprises a fixed bottom screw rod 62 inserted through a hole 531 at the horizontal board 53 (see FIGS. 2 and 6), and screwed up with an adjustment nut 63. The adjustment nut 63 is stopped at the bottom side wall of the horizontal board 53. Rotating the adjustment nut 63 causes the fixed bottom screw rod 62 to be moved upwards or downwards, and therefore the elevation of the bottom end of the adjustable cellular phone carrier board 60 is relatively adjusted. The other end, namely, the top end of the adjustable cellular phone carrier board 60 has a link 66 pivoted thereto at the bottom. A screw rod 65 is connected to the bottom side wall of the adjustable cellular phone carrier board 60 by a link 66. An adjustment nut 64 is threaded onto the screw rod 65. By means of rotating the adjustment nut 64, the elevation of the front end of the adjustable cellular phone carrier board 60 is relatively adjusted. By means of rotating the adjustment nuts 62 and 64, the elevational position of the adjustable cellular phone carrier board 60 is adjusted subject to the size of the master cellular phone 2 used. The adjustable cellular phone carrier board 60 further comprises a longitudinal sliding groove 68 extended to its front end at the top. A sliding locating plate 67 is inserted into the longitudinal sliding groove 68, and fixed to the adjustable cellular phone carrier board 60 at the desired location by a tightening up screw 69 to hold the master cellular phone 2 in place.

Figure 4:
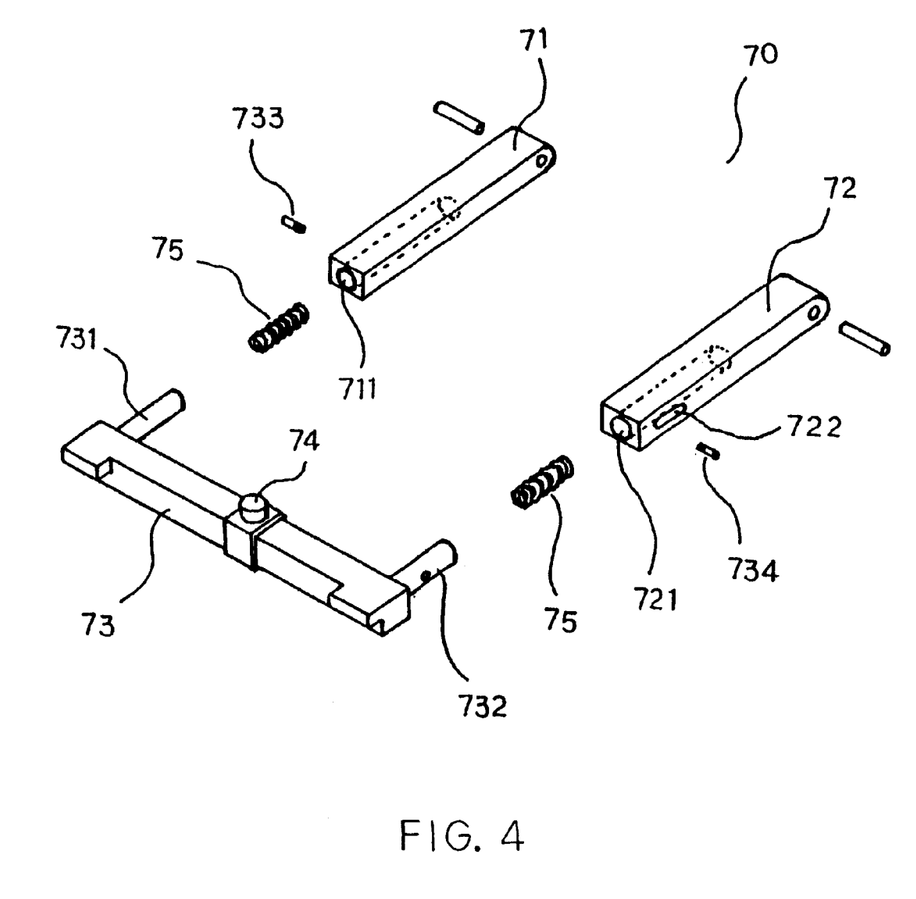
FIG. 4 is an exploded view of an actuating bar for a security system according to the first embodiment of the present invention.

The actuating bar 70 comprises two parallel side arms 71 and 72, a transverse arm 73, a sliding button 74, two spring elements 75, and two stop pins 733 and 734. The side arms 71 and 72 each have one end respectively pivoted to the vertical boards 51 and 52 adjacent to the top recesses 54 and 55 at one end, an opposite end provided with a longitudinally extended sliding slot 711 or 721, and an elongated side hole 712 or 722 disposed at an outer side in communication with the longitudinally extended sliding slot 711 or 721. The transverse arm 73 comprises two coupling pins 731 and 732 perpendicularly raised from two distal ends thereof in same direction, and respectively inserted into the longitudinally extended sliding slots 711 and 721 at the side arms 71 and 72. The stop pins 733 and 734 are respectively and perpendicularly fastened to the coupling pins 731 and 732 at the transverse arm 73, and extended out of the elongated side holes 712 and 722 at the side arms 71 and 72 to secure the coupling pins 731 and 732 to the side arms 71 and 72, enabling the coupling pins 731 and 732 to be moved with the transverse arm 73 back and forth in the longitudinally extended sliding slots 711 and 721 within a limited range. The spring elements 75 are respectively mounted in the longitudinally extended sliding slots 711 and 721 at the side arms 71 and 72 and stopped against the coupling pins 731 and 732, imparting an outward pressure to the coupling pins 731 and 732. The sliding button 74 is mounted on the transverse arm 73, and moved between the coupling pins 731 and 732.

The control device 80 comprises a control circuit board 81 mounted on the horizontal board 53 of the rack 50 at the bottom side, and a contact switch 82 mounted inside the rack 50 and connected to the control circuit board 81 by an electric wire. The aforesaid signal receiver 21 is installed in the control circuit board 81.

The movable pressure device 90 comprises two vertical movable rods 91 and 92 respectively inserted through a respective through hole (not shown) at the top recesses 54 and 55 at the vertical boards 51 and 52 of the rack 50, two hook plates 96 and 97 respectively and fixedly mounted on the vertical movable rods 91 and 92 at the top for hooking up the actuating bar 70, a horizontal pressure plate 93 connected between the vertical movable rods 91 and 92 and suspended below the horizontal board 53 of the rack 50, and two compression springs 94 and 95 respectively mounted on the vertical movable rods 91 and 92 and stopped between the vertical boards 51 and 52 of the rack 50 and the hook plates 96 and 97.

The driving device 100 is a motor fixedly mounted inside the rack 50 below the horizontal board 53, having an output shaft 101, and a cam 102 fixedly mounted on the output shaft 101 and peripherally disposed in contact with the top side wall of the horizontal pressure board 93.

The power supply unit 110 is a battery box mounted in the rack 50, and connected to the control device 80 and the driving device 100 by a circuit to provide the necessary working voltage.

Figure 2:
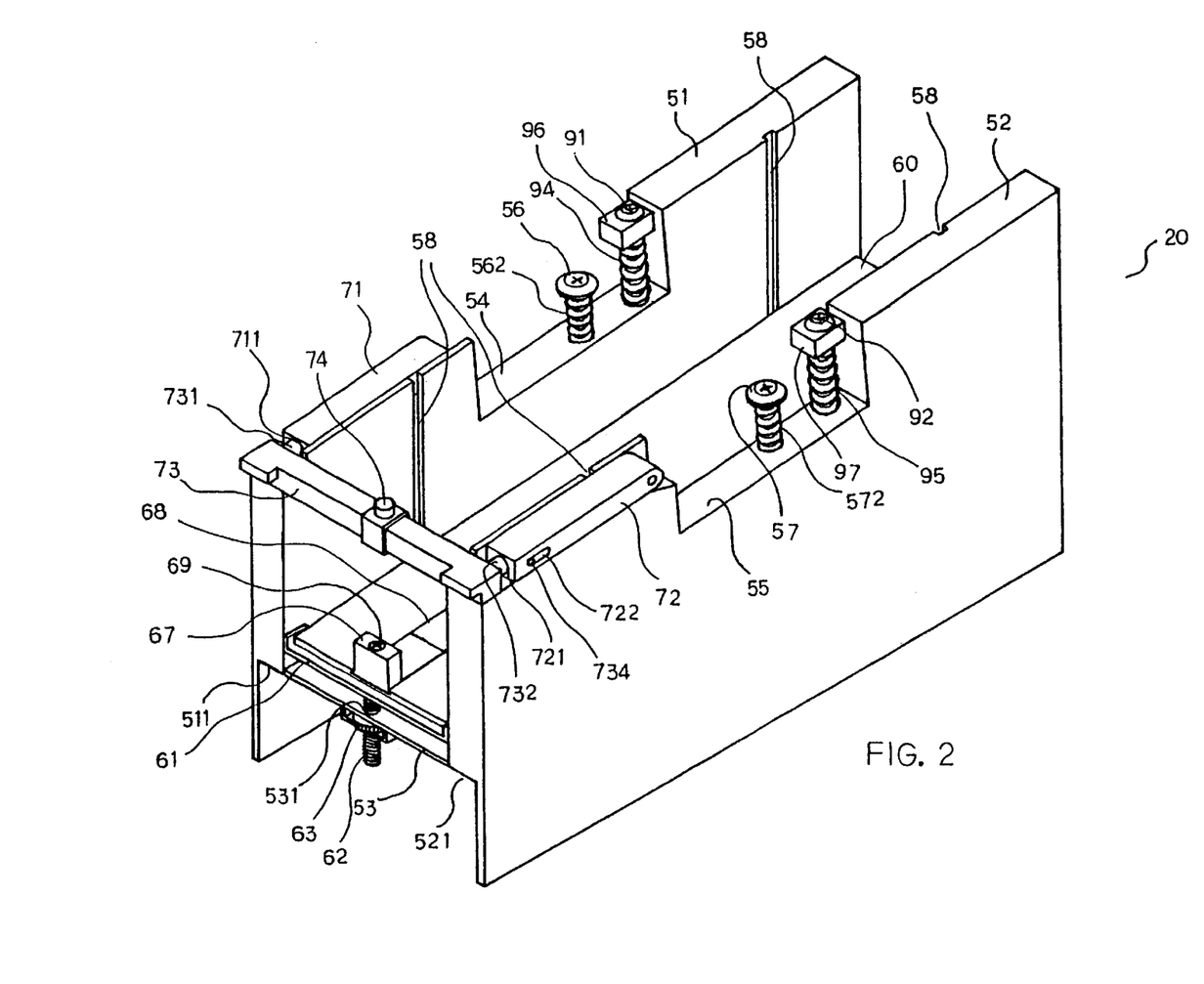
FIG. 2 is a perspective view of a mechanical type auto dialing unit for a security system according to the first embodiment of the present invention.
Figure 3:
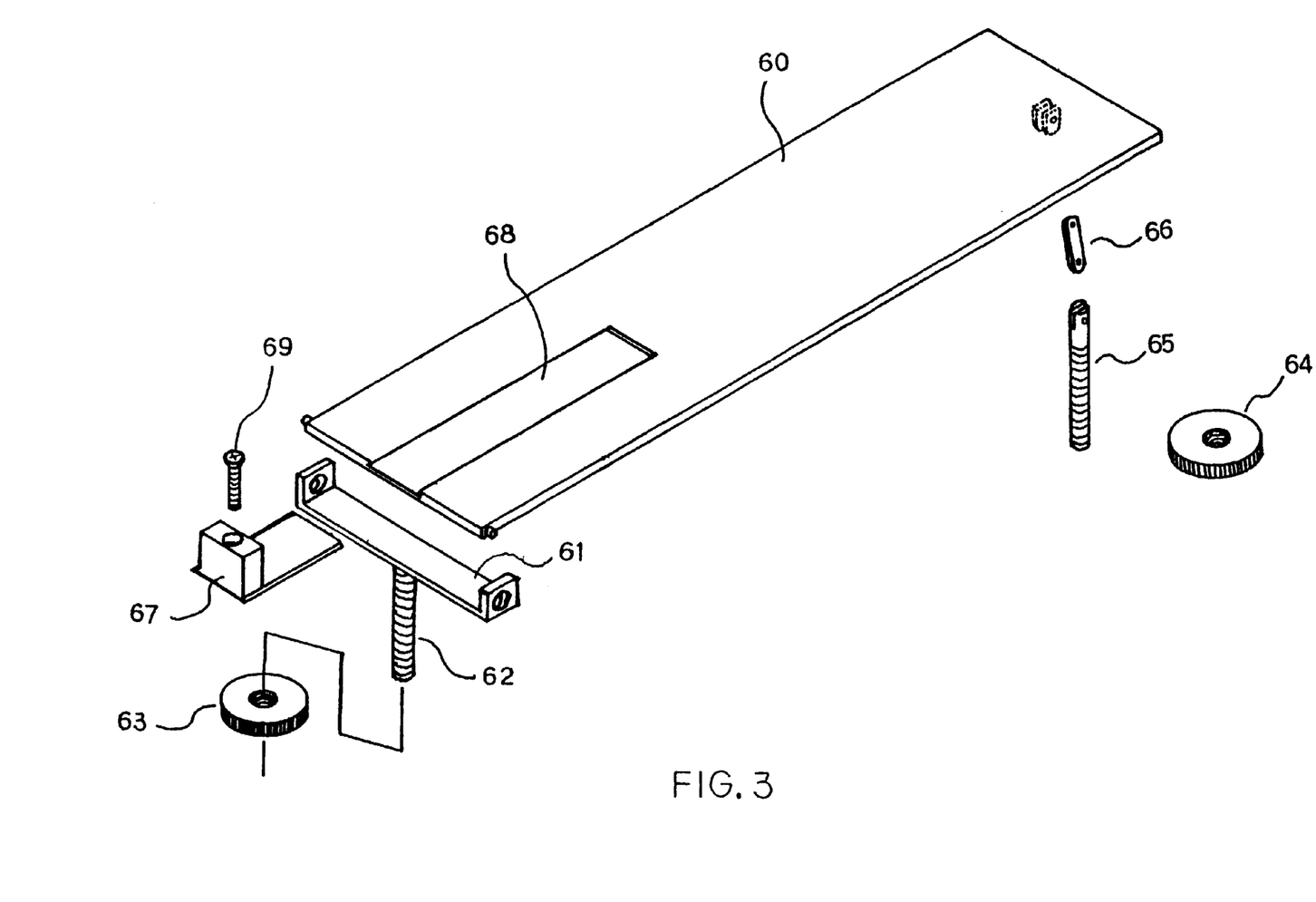
FIG. 3 is an exploded view of a cellular phone carrier board for a security system according to the first embodiment of the present invention.
Figure 5:
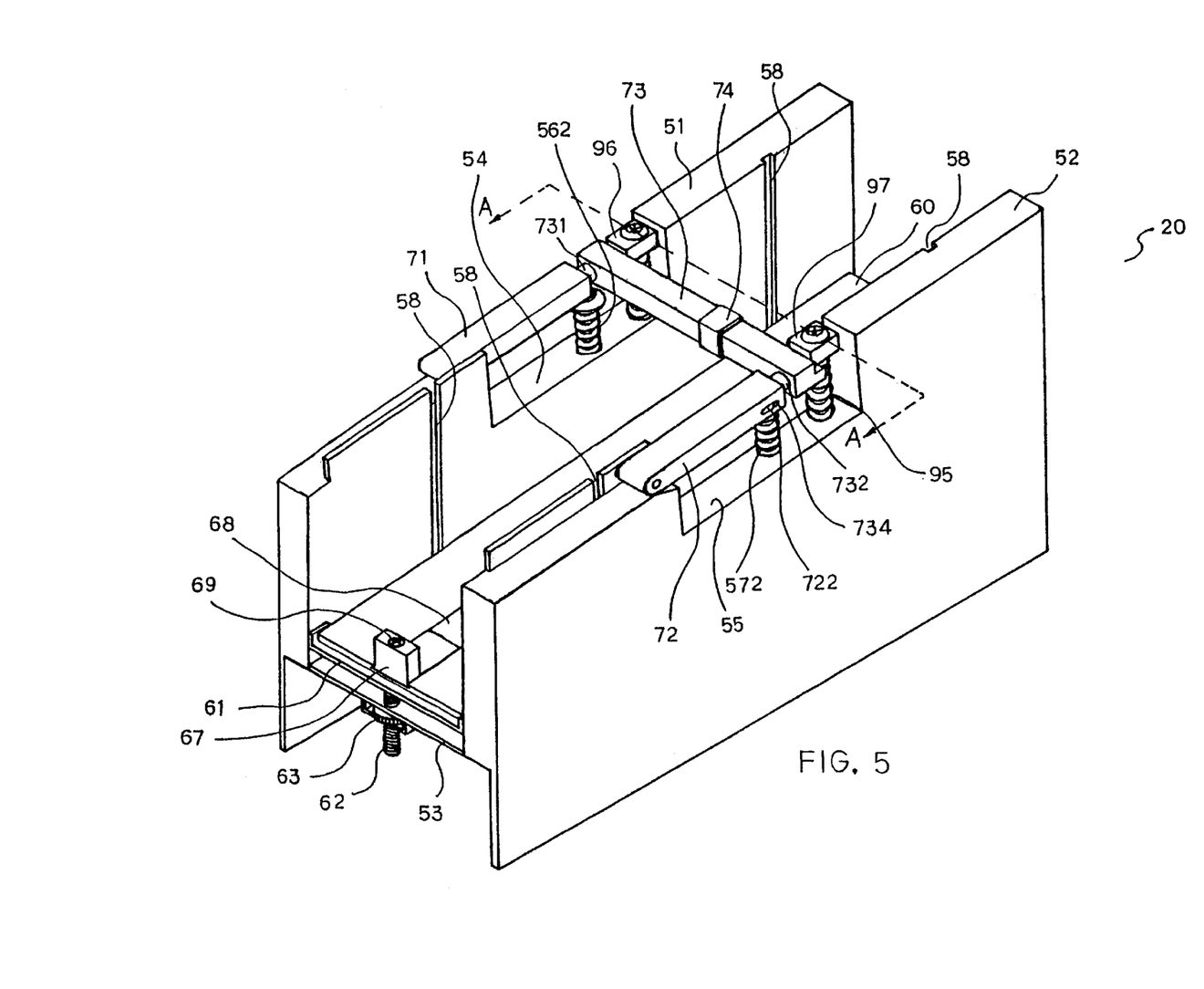
FIG. 5 is similar to FIG. 2 but showing the actuating bar turned to the working position.

When in use, the master cellular phone 2 is placed on the cellular phone carrier board 60 and secured in place by the sliding locating plate 67, then the actuating bar 70 is turned relative to the rack 50 from the non-working position shown in FIG. 2 to the working position shown in FIGS. 5 and 6 and supported on the buffer devices 56 and 57 and retained in the working position by the hook plates 96 and 97, and then the sliding button 74 is adjusted on the transverse arm 73 into vertical alignment with an "OK" key button 5 at the master cellular phone 2. When the signal receiver 21 receives a warning signal from the signal transmitter unit 10, the control circuit board 81 immediately controls the contact switch 82 to turn on the motor 100, causing the motor 100 to rotate the output shaft 101 and the cam 102 through two runs. Rotating the cam 102 through two runs causes the horizontal pressure board 93 to be reciprocated vertically twice, and therefore the "OK" key button 5 of the master cellular phone 2 is clicked twice at a fixed time interval (see FIGS. 7 and 8) to dial up a particular telephone number.

Because the cellular phone carrier board 60 is vertically adjustable, the mechanical type auto dialing unit 20 fits cellular phones of different thickness. However, because commercially available cellular phones have different dimensions, it is important to make the mechanical type auto dialing unit 20 capable of fitting any of a variety of cellular phones.

Referring to FIGS. 2, 7 and 8 again, vertical mounting grooves 58 are respectively provided at the vertical boards 51 and 52 of the rack 50 at an inner side, and a cellular phone holder 130 is mounted in the vertical mounting grooves 58 between the vertical boards 51 and 52 to hold the master cellular phone 2. The cellular phone holder 130 comprises a receiving chamber 131 fitting the master cellular phone 2, and a plurality of mounting plugs (not shown) respectively fastened to the vertical mounting grooves 58 at the vertical boards 51 and 52 of the rack 50.

Figure 9:
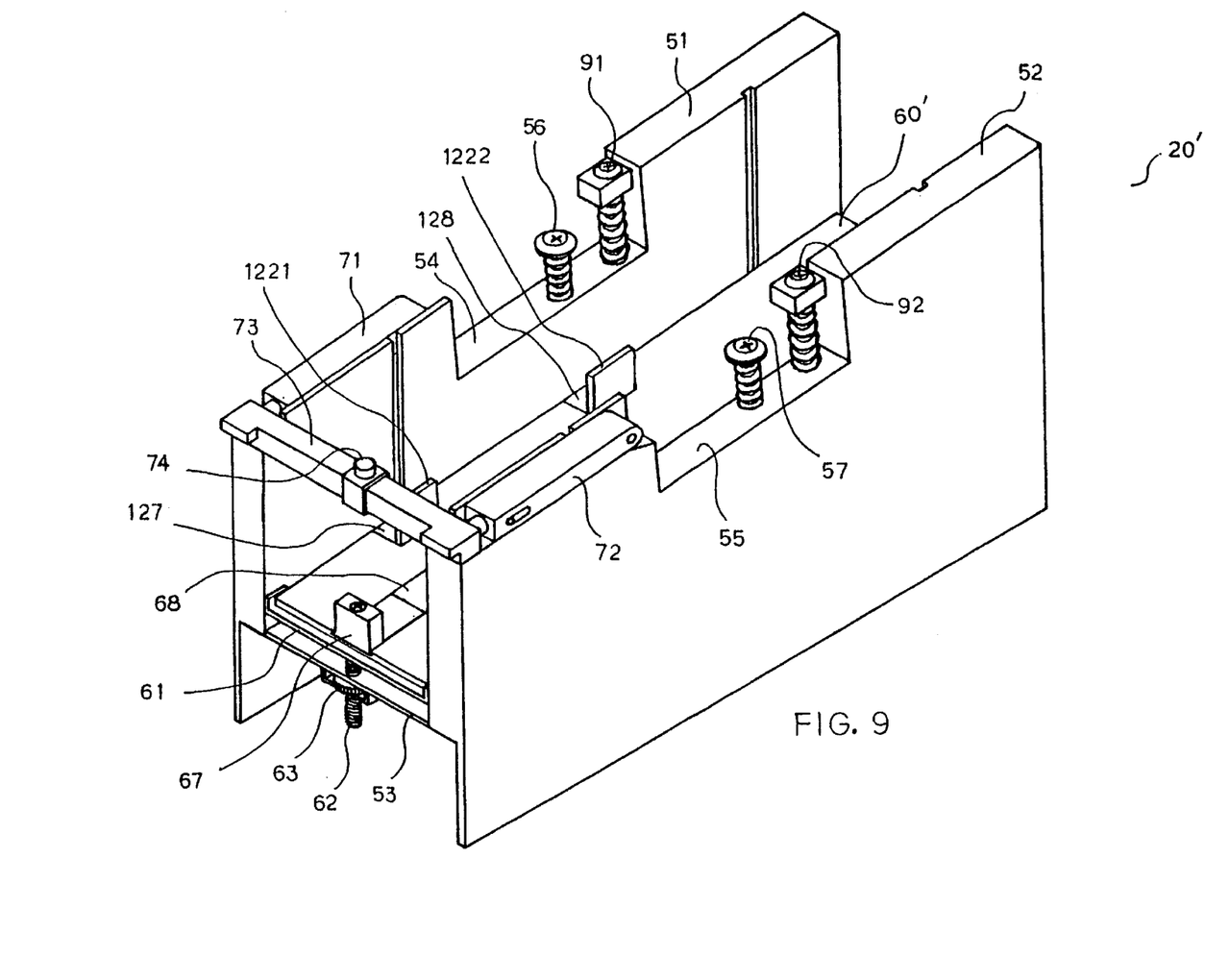
FIG. 9 is a perspective view of a mechanical type auto dialing unit for a security system according to a second embodiment of the present invention.
Figure 10:
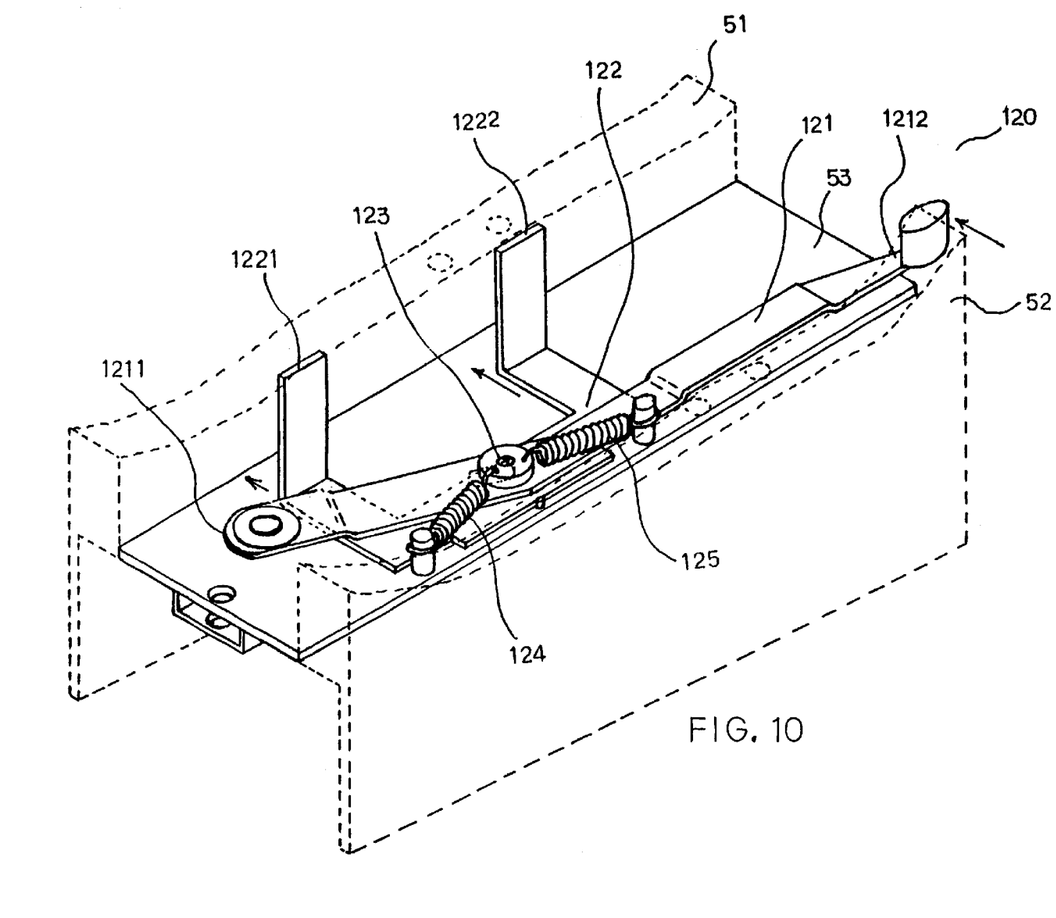
FIG. 10 is a perspective view of the spring-supported holding down device of the mechanical type auto dialing unit according to the second embodiment of the present invention.
Figure 11:
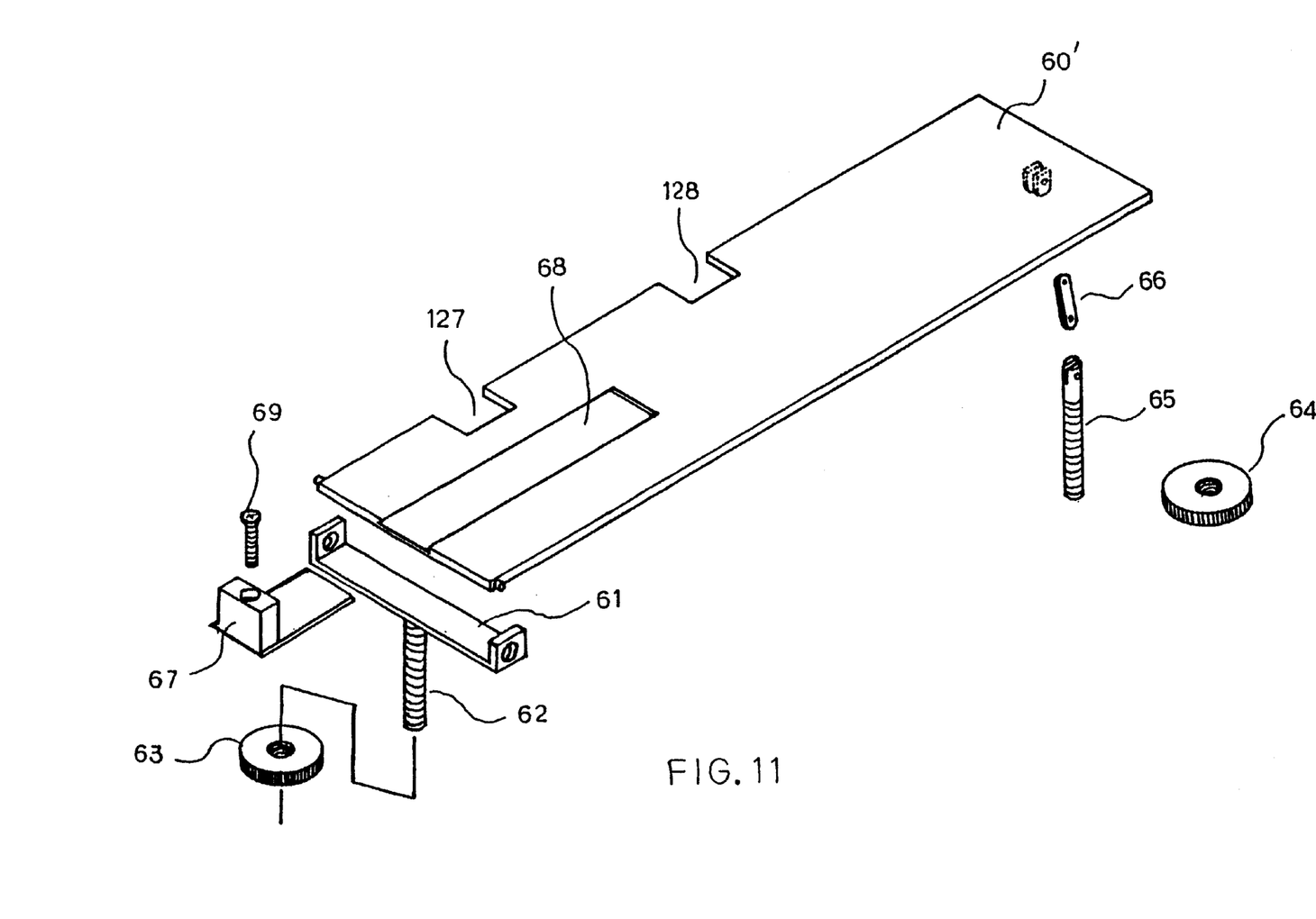
FIG. 11 is an exploded view of the cellular phone carrier board according to the second embodiment of the present invention.

FIGS. 9 through 11 show an alternate form of the present invention. According to this embodiment, the mechanical type auto dialing unit 20' comprises a spring-supported holding down device 120 installed in the rack for holding down the master cellular phone. The spring-supported holding down device 120 comprises a lever 121 having an inner end 1211 pivoted to the horizontal board 53 and an outer end 1212 extended out of the horizontal board 53, a substantially U-shaped plate 122 pivoted to the lever 121 by a pivot 123 and disposed between the lever 121 and the horizontal board 53, and two tensile springs 124 and 125 symmetrically connected between the lever 121 and the horizontal board 53 adjacent to the pivot 123. The U-shaped plate 122 is turned about the pivot 123, having two upwardly extended, angled clamping ends 1221 and 1222. The cellular phone carrier board 60' has two parallel sliding openings 127 and 128 through which the angled clamping ends 1221 and 1222 of the U-shaped plate 122 pass. The tensile springs 124 and 125 pull the lever 121 in one direction, keeping the angled clamping ends 1221 and 1222 to be moved with the U-shaped plate 122 to one end at the parallel sliding slots 127 and 128. Before putting the master cellular phone 2 in the cellular phone carrier board 60', the outer end 1212 of the lever 121 is pulled with the hand in one direction to move the U-shaped plate 122 along the parallel sliding openings 127 and 128. After installation of the master cellular phone 2, the lever 121 is released from the hand and pulled back to its former position by the tensile springs 124 and 125, enabling the angled clamping ends 1221 and 1222 of the U-shaped plate 122 to clamp on the master cellular phone 2, and therefore the master cellular phone 2 is firmly retained to the cellular phone carrier board 60' in position.

As indicated above master cellular phone 2 is supported above the cellular phone carrier board 60 or 60' of the mechanical type auto dialing unit 20 or 20'. In order to let the sliding button 74 be able to positively trigger the "OK" key button 5 of the master cellular phone 2, the actuating bar 70 is arranged in parallel to the master cellular phone 2, and the movable pressure device 90 is arranged perpendicular to the actuating bar 70.

Figure 12:
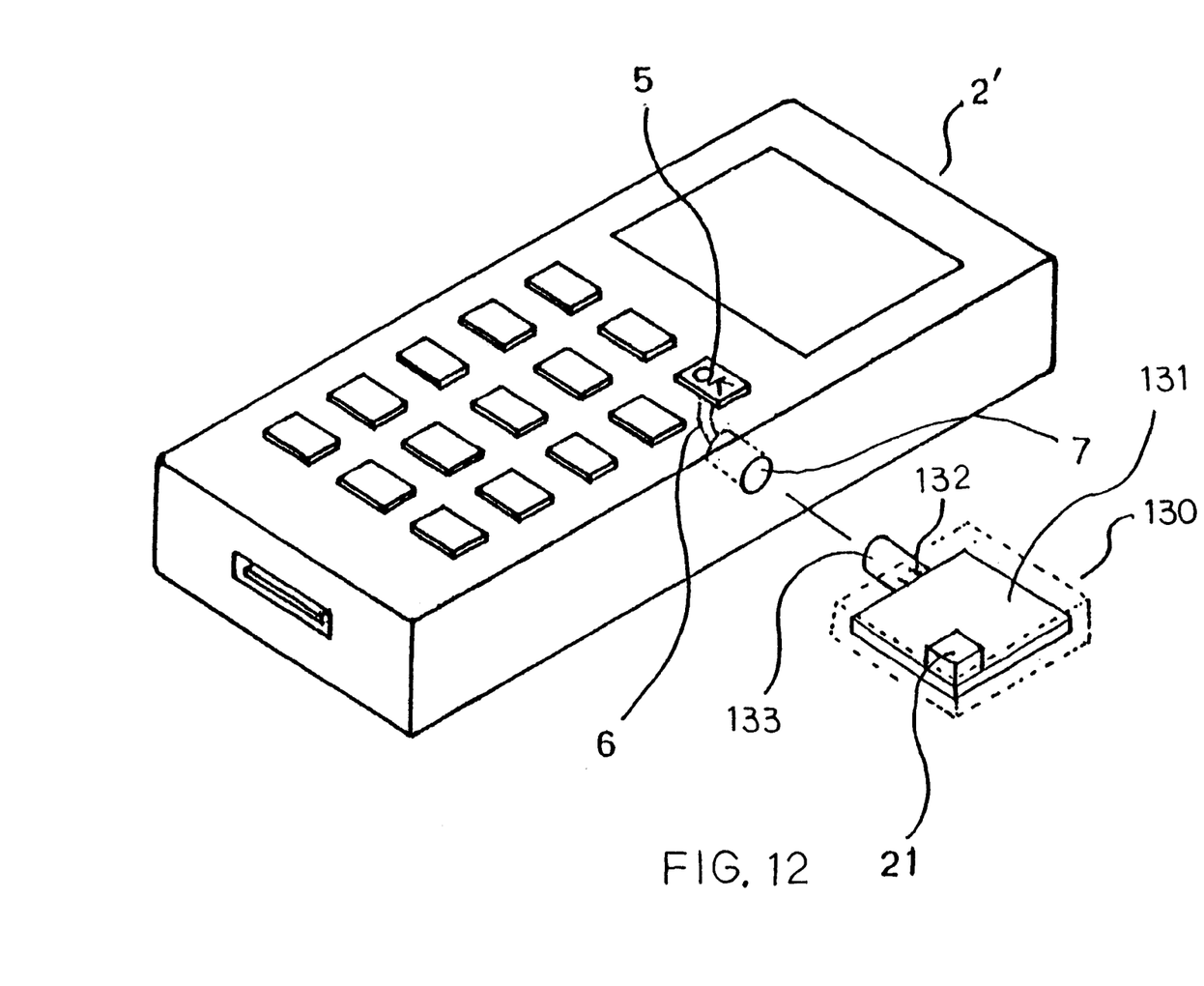
FIG. 12 is an exploded view of a master cellular phone and an electronic type auto dialing unit for a security system according to a third embodiment of the present invention.

FIG. 12 shows another alternate form of the present invention. According to this alternate form, the master cellular phone 2' is coupled to an electronic type automatic dialing unit 130. The electronic type automatic dialing unit 130 comprises a circuit board 131, and a signal receiver 21 installed in the circuit board 131. The circuit board 131 comprises an electric plug 133, and an output circuit 132 connected to the electric plug 133. The master cellular phone 2' comprises a jack 7 at one lateral side wall thereof, and a switching circuit 6 connected to the "OK" key button 5. When in use, the electric plug 133 is plugged into the jack 7 at the master cellular phone 2'. When the signal receiver 21 receives a warning signal from the warning signal transmitter unit 10, it immediately drives the electronic type automatic dialing unit 130 to dial the master cellular phone 2', causing it to call the telephone 3 or sub-cellular phone 4 (see also FIG. 1). The electronic type automatic dialing unit 130 may obtain battery power supply from the master cellular phone 2'. Alternatively, a battery box (not shown) may be directly installed in the circuit board 131 to provide the necessary working voltage to the electronic type automatic dialing unit 130.

Figure 13:
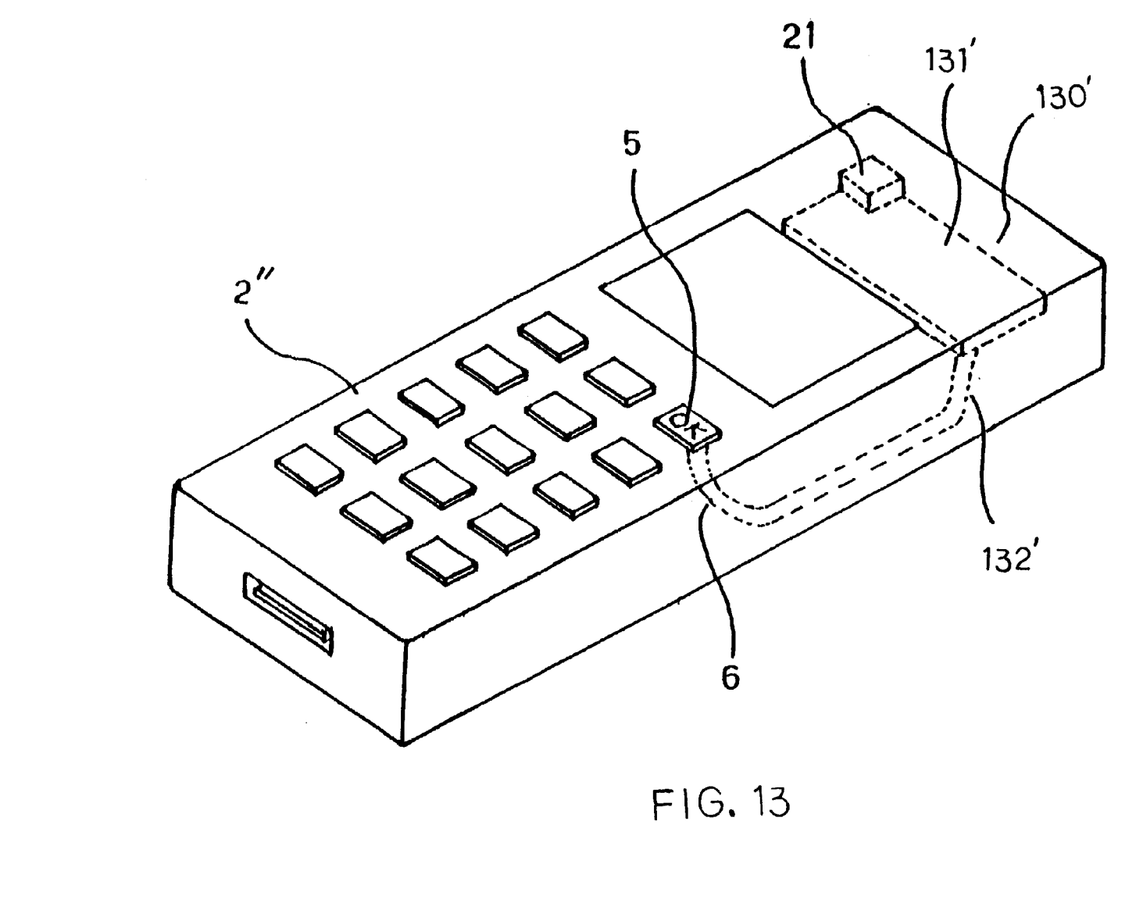
FIG. 13 illustrates an electronic type auto dialing unit built in a master cellular phone according to a fourth embodiment of the present invention.
Figure 14:
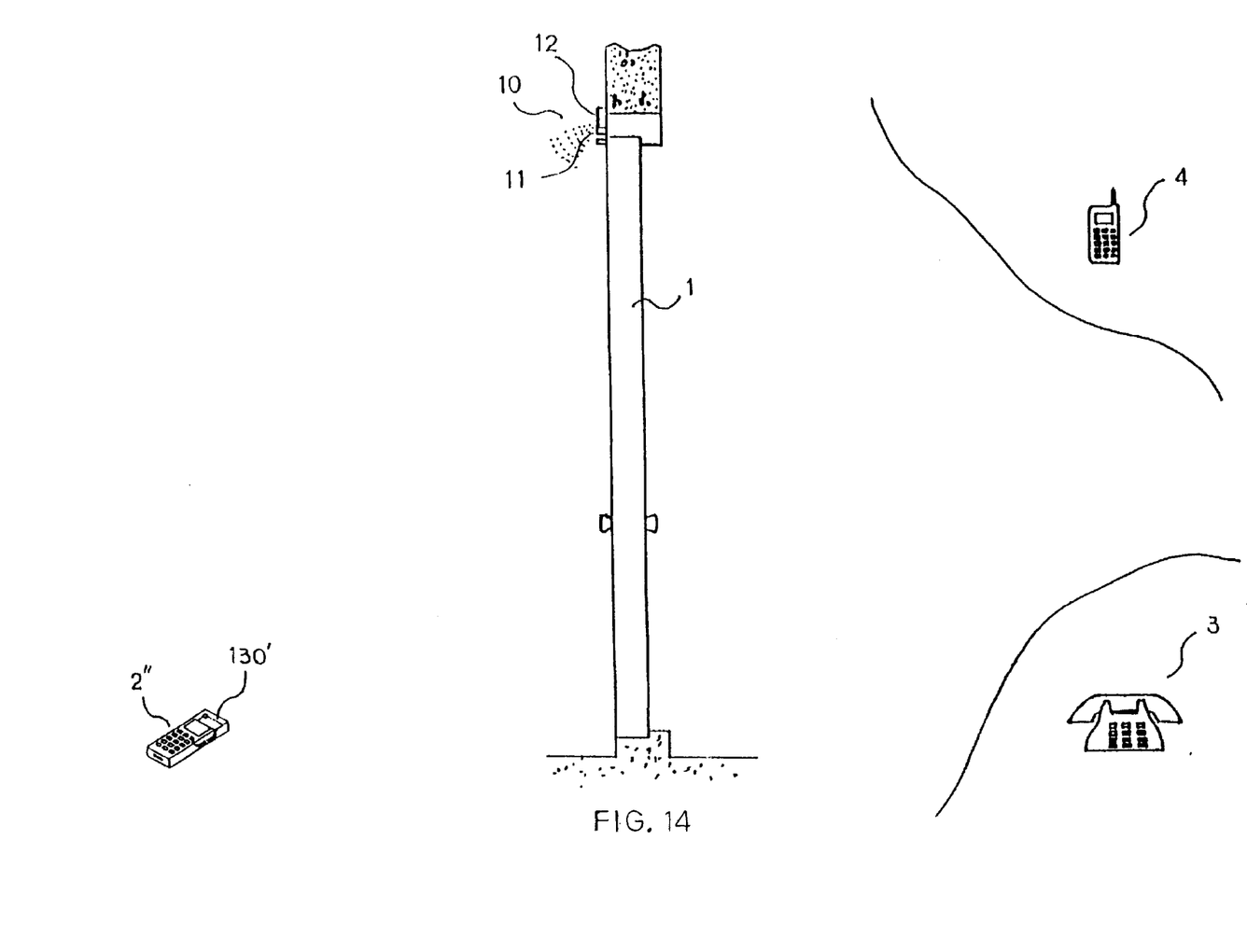
FIG. 14 is a schematic drawing showing the arrangement and operation of the security system according to the fourth embodiment of the present invention.

FIGS. 13 and 14 show still another alternate form of the present invention. According to this alternate form, an electronic type automatic dialing unit 130' is built in the master cellular phone 2". The electronic type automatic dialing unit 130' comprises a circuit board 131', and a signal receiver 21' installed in the circuit board 131'. The circuit board 131' is connected to a switching circuit 6 at the "OK" key button 5 of the master cellular phone 2". When the signal receiver 21 receives a warning signal from the warning signal transmitter unit 10, it immediately drives the circuit board 131' to switch on the "OK" button 5 twice, thereby causing the master cellular phone 2" to call the telephone 3 or sub-cellular phone 4.

Because the mechanical type automatic dialing unit or electronic type automatic dialing unit automatically dials a set telephone number within a short time, a warning signal can be quickly given to the assigned party when an emergency condition occurs. Therefore, the assigned party can receive the signal before the intruder damages the security system.

Because the security system of the present invention is designed to be used with a commercially available cellular phone, the use of the present invention must consider the characteristics of commercially available cellular phone, i.e., before the application of the present invention, the master cellular phone 2, 2' or 2" must be turned on and set into the mode for transferring incoming call to another telephone, so as to prevent an interference with the auto dialing function. Thereafter, the master cellular phone 2 is set in the mechanical type auto dialing unit 20 or 20'. If the master cellular phone 2' is used, it is coupled to the electronic type auto dialing unit 130. Alternatively the master cellular phone 2" may be used. When the mechanical type auto dialing unit 20 or 20', or the electronic type auto dialing unit 130 or 130' receives a warning signal from the warning signal transmitter unit 10, the master cellular phone 2, 2' or 2" is immediately driven to achieve an auto dialing operation.

Further, either the mechanical type auto dialing unit 20 or 20', or the electronic type auto dialing unit 130 or 130' is used, there is about 5 minutes of time delay when started, so that the user has sufficient time to leave the place or equipment under protection. The mechanical type auto dialing unit 20 or 20', or the electronic type auto dialing unit 130 or 130' is set to start again 5 minutes after each triggering. Therefore, the master cellular phone 2, 2' or 2" has sufficient time to complete circuit cutting off operation and to further enter the stand-by mode if no body picks up the master cellular phone 2, 2' or 2" upon an incoming call.

Further, if the master cellular phone 2, 2' or 2" is set to dial a cellular phone 4, the voice box function of the cellular phone 4 is suggested to be turned off, so as to save the calling charge. In case the cellular phone 4 is a voice-controlled cellular phone, a particular sound is recorded in the master cellular phone 2, 2' or 2" in the warning message before, for example, the bark of a dog, for switching on the cellular phone As indicated above, the mechanical type or electronic type auto dialing unit according to the present invention can automatically dial a cellular phone to call a particular number when a abnormal condition occurs, so that the property owner can take the necessary step in time. Because the auto dialing function is started by a radio warning signal, and the mechanical type or electronic type auto dialing unit has self-provided battery power supply, the master cellular phone and the mechanical type or electronic type auto dialing unit can be received in a secret place kept from sight. Because the master cellular phone can be triggered to dial a particular telephone number within a short time after the occurrence of an abnormal condition, the security system is practical in use, and can positively inform the user of the situation. Further, because the structure of the security system is simple, the installation cost of the present invention is inexpensive.

It is to be understood that the drawings are designed for purposes of illustration only, and are not intended for use as a definition of the limits and scope of the invention disclosed.

What the invention claimed is:

1. A mobile security system comprising a cellular phone and an auto dialing unit, said cellular phone comprising a jack, an OK key button driven to dial a set telephone number, and a switching circuit connected between said jack and said OK key button, said auto dialing unit comprising a circuit board and a signal receiver installed in said circuit board for receiving a radio warning signal from an external warning signal transmitter means, said circuit board comprising an output circuit controlled by said signal receiver to output a control signal, and a fixed electric plug connected to said output circuit for connection to the jack at said cellular phone for transmitting said control signal from said circuit board to said switching circuit to further switch on said OK key button twice, causing said OK key button to dial a set telephone number.

2. The mobile security system of claim 1 wherein further comprising a power supply device for providing said cellular phone and said auto dialing unit with the necessary working electricity.

3. The mobile security system of claim 1 wherein said auto dialing unit further comprises a battery power supply for providing the necessary working electricity to said circuit board and said signal receiver.

4. A mobile security system comprising a cellular phone and an auto dialing unit built in said cellular phone, said cellular phone comprising an OK key button driven to dial a set telephone number, and a switching circuit controlled to drive said OK key button to dial a set telephone number, said auto dialing unit comprising a circuit board having output circuit connected to said OK key button through said switching circuit, and a signal receiver installed in said circuit board for receiving a radio warning signal from an external warning signal transmitter means for driving said switching circuit to switch on said OK key button twice, causing said OK key button to dial a set telephone number.

5. The mobile security system of claim 4 wherein further comprising a power supply device for providing said cellular phone and said auto dialing unit with the necessary working electricity.

6. The mobile security system of claim 4 wherein said auto dialing unit further comprises a battery power supply for providing the necessary working electricity to said circuit board and said signal receiver.

7. An auto dialing unit used in a mobile security system, comprising a rack, an adjustable cellular phone carrier board, an actuating bar, a control device, a movable pressure device for driving said actuating bar up and down, a driving device, and a power supply unit, wherein:

said rack comprises two opposing vertical boards arranged in parallel, and a horizontal board connected between said vertical boards, said vertical boards each comprising a longitudinally extended step structure, a substantially rectangular top recess on the middle, and a buffer device mounted in said top recess;

said adjustable cellular phone carrier board is supported on said horizontal board inside said rack by vertically adjustable positioning means to carry a cellular phone, having a sliding locating plate inserted into a longitudinal sliding groove thereof and fixed thereto at the desired location by a tightening up screw to hold a cellular phone in place;

said actuating bar is a U-shaped bar pivoted to said vertical boards of said rack and turned between a first position where said actuating bar is disposed outside the top recess at each of said vertical boards, and a second position where said actuating bar is disposed in the top recess at each of said vertical boards and supported on the buffer device in the top recess at each of said vertical boards, comprising two parallel side arms each have a first end respectively pivoted to said vertical boards of said rack and a second end, a transverse arm connected between the second end of said side arms, and a sliding button mounted on said transverse arm and moved between said side arms;

said control device comprises a control circuit board mounted on the horizontal board of said rack at a bottom side, and a signal receiver installed in said control circuit board for receiving a radio warning signal from an external warning signal transmitter means;

a movable pressure device comprises two vertical movable rods respectively inserted through a respective through hole at the top recess at each of the vertical boards of said rack, two hook plates respectively and fixedly mounted on said vertical movable rods at a top side for hooking up said actuating bar when said actuating bar is turned to said second position, a horizontal pressure plate connected between said vertical movable rods suspended below the horizontal board of said rack, and two compression springs respectively mounted on said vertical movable rods and stopped between the vertical boards of said rack and said hook plates;

said driving device comprises a motor fixedly mounted inside said rack below said horizontal board, said motor having an output shaft, and a cam fixedly mounted on the output shaft of said motor and peripherally disposed in contact with the horizontal pressure board of said movable pressure device;

said power supply unit is a battery box mounted in said rack and connected to said control device and said driving device by a circuit to provide the necessary working voltage;

when a cellular phone is placed on said cellular phone carrier board and secured in place by said sliding locating plate, said actuating bar is turned to said second position and retained in place by said hook plates, enabling said sliding button to be aimed at a key button for making calls at the cellular phone installed in said cellular phone carrier board, and said control device drives said motor to rotate said cam through two runs when said signal receiver receives a warning signal from an external warning signal transmitter means, causing said actuating bar to be pulled down twice, so that the key button for making calls of the cellular phone is triggered twice by said sliding button to call a predetermined telephone number.

8. The auto dialing unit of claim 7 wherein said adjustable cellular phone carrier board has one end mounted with a U-bar having a bottom screw rod inserted through a hole at the horizontal board of said rack and screwed up with an adjustment nut for adjusting the elevation of said adjustable cellular phone carrier board relative to the horizontal board of said rack, and an opposite end coupled to a link having a distal end pivoted to a screw rod and screwed up with an adjustment nut for adjusting the elevation said adjustable cellular phone carrier board relative to the horizontal board of said rack.

9. The auto dialing unit of claim 7 wherein said side arms of said actuating bar each have one end respectively pivoted to the vertical boards of said rack, an opposite end provided with a longitudinally extended sliding slot, and an elongated side hole disposed at an outer side in communication with said longitudinally extended sliding slot, and the transverse arm of said actuating bar comprises two coupling pins perpendicularly raised from two distal ends thereof in same direction and respectively inserted into the longitudinally extended sliding slots at said side arms and supported on a respective compression spring in the longitudinal extended sliding slots at said side arms, said coupling pins each having a stop pin perpendicularly disposed at one side and respectively extended out of the elongated side holes at said side arms.

10. The auto dialing unit of claim 7 further comprising a spring-supported holding down device installed in said rack for holding down a cellular phone on said adjustable cellular phone carrier board, said spring-supported holding down device comprising a lever having an inner end pivoted to the horizontal board of said rack and an outer end extended out said rack for turning by hand, a substantially U-shaped plate pivoted to said lever by a pivot and disposed between said lever and the horizontal board of said rack, and two tensile springs symmetrically connected between said lever and the horizontal board of said rack adjacent to said pivot, said U-shaped plate having two upwardly extended, angled clamping ends inserted through a respective sliding opening at said adjustable cellular phone carrier board for clamping a cellular phone on said adjustable cellular phone carrier board.

11. The auto dialing unit of claim 7 wherein the side boards of said rack each have vertical mounting grooves arranged in parallel at an inner side for the positioning of a cellular phone holder for holding a cellular phone.

\* \* \* \* \*